Nov. 8, 1960 R. ALTSON 2,958,951
DIMENSIONAL TOLERANCE GAUGE
Filed Sept. 15, 1958

INVENTOR
Ralph Altson
BY Edward H. Goodrich
HIS ATTORNEY

United States Patent Office 2,958,951
Patented Nov. 8, 1960

2,958,951

DIMENSIONAL TOLERANCE GAUGE

Ralph Altson, Douglaston, N.Y., assignor to General Motors Corporation, Detroit, Mich., a corporation of Delaware Filed Sept. 15, 1958, Ser. No. 761,100

8 Claims. (Cl. 33—178)

This invention relates to gauges for checking dimensional tolerances of concave surfaces and particularly for measuring large radii of a cylindrical or parti-cylindrical surface in comparison to a known standard.

Heretofore, gauges employed in measuring large radii and particularly gauges employed for measuring the cylindrical curvature of railroad journal box bearings have been complicated mechanisms which required that the part to be measured should be initially set up and carefully levelled upon a measuring bench upon which the measuring apparatus or caliper head was mounted. Furthermore, with such an arrangement, it has been difficult to quickly and easily scan all portions of the curved surface.

The present invention is particularly useful in confined applications wherein the measuring gauge may be easily applied to and supported by the curved surface to be measured. For example, the semicylindrical surface of a railroad journal box may be quickly and effectively measured by simply putting my gauge against the curved surface and scanning the surface with the gauge.

It is, therefore, an object of this invention to provide an easily portable and simply constructed measuring gauge which may be located against a uniformly curved surface to determine its accuracy.

It is a further object of my invention to provide an improved gauge for measuring semicylindrical surfaces and the like and which automatically locates the position of a gauging head with respect to the surface being measured.

Figure 1:
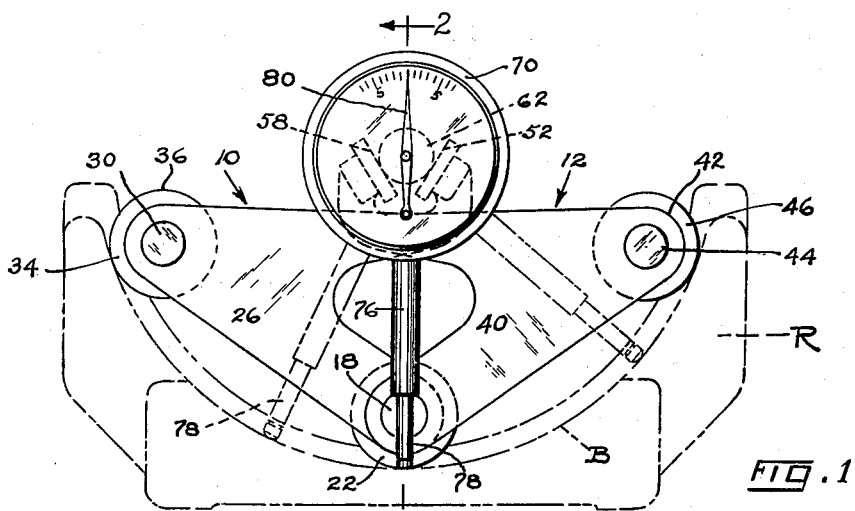
Figure 2:
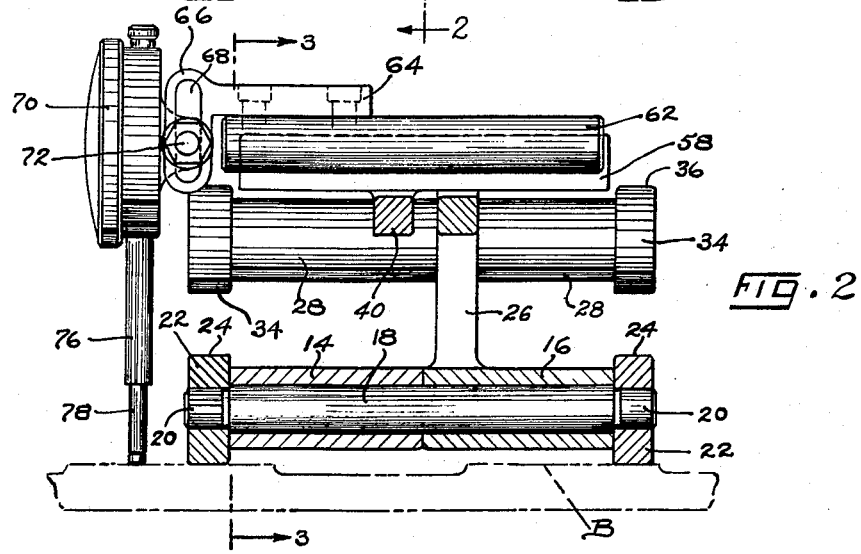
Figure 3:
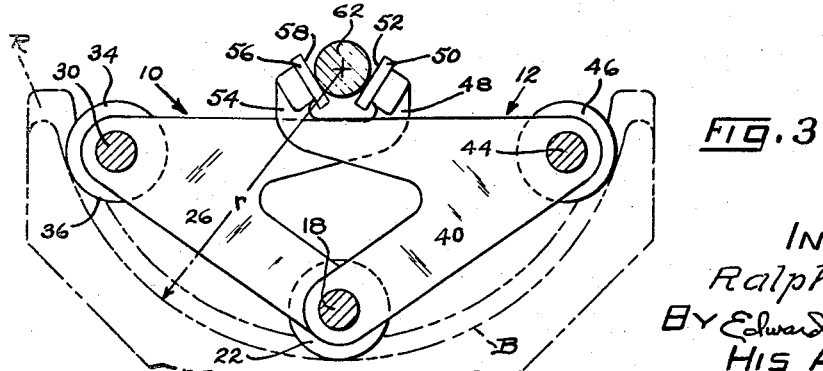

To these ends and also to improve generally upon devices of this character, this invention consists in the various matters hereinafter described and claimed. In its broader aspects, the invention is not necessarily limited to the specific structures and methods of manufacture selected for illustrative purposes in the accompanying drawings wherein Figure 1 is a front end elevation of my invention showing the gauge in measuring position;

Figure 2 is a vertical cross section through my gauge in measuring position taken substantially along the line 2—2 of Figure 1; and Figure 3 is a cross-sectional view of my gauge taken substantially along the line 3—3 in Figure 2.

My gauge, which is adaptable to measuring any generally uniform concave surface, is herein illustrated in measuring position in a railroad journal box generally indicated at R and having a concave bearing surface of revolution B. Whereas, this gauge is particularly useful for measuring a substantially cylindrical type of surface, it is also adapted for measuring conical surfaces providing the gauge is located in desired axial position with respect to the axis of the surface.

As illustrated, a pair of pivot frame members 10 and 12 are respectively provided at their lower ends with hubs 14 and 16 which are preferably in smooth-faced abutting engagement at their inner ends and which are axially bored to closely receive a pivot shaft 18. One or both of the hubs 14 and 16 are rotatably journalled upon the shaft 18 to provide for an angular swinging movement of the frame members 10 and 12 with respect to each other about the pivot shaft axis. Also, the combined lengths of the hubs 14 and 16 are preferably through a considerable length of the bearing surface B for accuracy of the gauge. Respectively secured to reduced ends 20 of the pivot shaft 18 are a pair of similar rollers 22 whose inner faces may rotatably engage against the outer ends of the hubs 14 and 16. These rollers are of corresponding size and preferably have cylindrical outer peripheries 24. A generally triangular shaped arm 26 extends upwardly and outwardly from the hub 14 and terminates in a longitudinal hub 28 bored to receive a pivot shaft 30 parallel to the pivot shaft 18. Rollers 34 similar to the rollers 22 are secured to the reduced ends of the pivot shaft 30 and have circular outer peripheries 36 for engagement with the curved bearing surface B. These rollers are preferably cylindrical and may be of the same size as the rollers 22.

The pivot frame member 12 has an arm 40 extending outwardly and upwardly from the hub 16 in spaced relation to and laterally in the opposite direction from the arm 26. The arm 40 similarly terminates in an elongated hub 42 which is bored to closely receive a pivot shaft 44 whose reduced outer ends support rotatable rollers 46 similar to the rollers 34 and 22. The rollers 46 may be of the same size as the rollers 34 and may have a cylindrical periphery. The upper end of the triangular shaped arm 26 above the hub 14 is provided with a vertical projection 48 having an angularly disposed anvil plate 50 provided with a flat face 52 that extends preferably through a considerable horizontal distance above the hubs 14 and 16. Similarly, the triangular shaped arm 40 has at its upper end above the hub 16 an upwardly extending projection 54 provided with an angularly disposed anvil plate 56 having a flat horizontally extending anvil face 58 corresponding to the anvil face 52 and in angular relation thereto. The flat anvil face 52 on the arm 26 is located to the right of a vertical plane extending through the axis of the shaft 18 and the flat anvil face 58 is located to the left of this vertical plane as viewed in Figures 1 and 3.

A cylindrical gauge supporting shaft 62 is horizontally supported by the angularly opposed flat faces 52 and 58. It will be appreciated that the frame members 10 and 12 which are pivotally supported by the shaft 18 determine their angular relation by the engagement of the sets of rollers 34, 46 and 22 against the concave surface B. The angular positions of these frame members 10 and 12 similarly locate the spacing and angular relation between the flat anvil faces 52 and 58 and correspondingly position the gauge supporting shaft 62. The spacing of these surfaces 52 and 58 and the diameter of the gauge supporting shaft 62 together with the angular relation of the flat faces 52 and 58 is arranged so that the axis of the gauge shaft 62 will coincide with the axis of curvature of the surface B through a considerable range of radii of the surfaces B to be measured as indicated at r.

A mounting bracket 64 secured to the forward end of the gauge supporting shaft 62 and preferably to its upper side so as to avoid engagement with the flat faces 52 and 58, has a downwardly extending yoke member 66 horizontally cut through with an elongated vertical slot 68. A dial gauge 70 is vertically and adjustably secured to the shaft 62 through a cross bolt 72 extending through the slot 68 and clamping a rearwardly protruding boss of the gauge to the yoke member 66. The gauge 70 has the usual downwardly extending sleeve portion 76 in which is slidably mounted a spring-urged gauge stem 78 having a rounded nose positioned by the concave surface B. This gauge stem is mechanically connected within the gauge head to operate a gauge pointer 80 over a suitable scale to indicate changes in side of the surface B. The yoke portion 66 of the bracket engages the rearwardly protruding boss on the gauge head in such position that the axis of the gauge stem always lies along a radius of the surface B being measured when the vertical adjustment of the gauge through the bolt 72 is properly preset. With this arrangement, the frame members 10 and 12 may be positioned within a bearing to locate the supporting rollers 34, 46 and 22 against the surface to be measured and the gauge assembly may be mounted with the gauge supporting shaft on the angularly disposed flat faces 52 and 58. With the gauge head 70 in proper adjustment with respect to its supporting shaft 62, the gauge head may be rotated through the rotatable engagement of the shaft 62 against the flat faces 52 and 58 causing the gauge stem to angularly explore any desired portion of the bearing surface. Also, the entire unit may be axially slid in the bearing surface to explore all desired portions of the bearing.

I claim:

1. In a gauge for measuring accuracy of curvature of a surface, a pair of frames having divergent outwardly extending arms, a pivotal connection between the lower portions of the frames for swinging movement about a longitudinal axis, frame supporting members adjacent said pivotal connection, frame supporting members at the outer ends of said arms, the frame supporting members being engageable with the curved surface during its measurement to position the frames relative to each other, spaced projections respectively extending upwardly from each frame and above said pivotal connection, angularly disposed anvil portions on the spaced projections, a shaft rotatably supported by the anvil portions and coaxial with the curvature of the surface at points of engagement of said supporting members, and a gauge carried by the shaft and engageable with the surface to be measured.

2. In a gauge for measuring curved surfaces, a pair of frames having outwardly and upwardly extending portions, a pivot member supporting the adjacent lower ends of the frames, supporting members secured to the pivot member adjacent said frames, supporting members for the outwardly extending frame portions, all of said supporting members being engageable with the curved surface during its measurement and locating the frames with respect to each other, spaced projections respectively extending upwardly from each frame above said pivot member, each projection having an angularly disposed flat face extending longitudinally above said pivot member, a shaft rotatably supported by said flat faces, and a gauge supported by said shaft, the gauge having a measuring member extending past the frames and engageable with the surface to be measured.

3. In a gauge for measuring accuracy of curvature of a concave surface, a pair of frames having divergent outwardly extending arms, a pivot member connecting adjacent lower portions of the frames for swinging frame movements, a frame supporting member on each end of said pivot member, frame supporting members at the outer ends of said arms, said supporting members being engageable with the surface being measured to angularly locate the frames with respect to each other, an upwardly extending projection on each frame above said pivot member and disposed above the other frame and at one side of a vertical plane through said pivot member, said upwardly extending projections being respectively provided with flat faces extending longitudinally of the pivot member and converging towards said vertical plane, a shaft rotatably supported by said flat faces, and a gauging mechanism supported by the shaft and engageable with said concave surface.

4. In a gauge for measuring accuracy of curvature of a concave surface, a pair of frames having divergent outwardly extending arms, a pivot shaft connecting the adjacent lower ends of the arms for relative swinging frame movements about the shaft axis, frame supports on each end of the shaft and engageable with said concave surface, frame supports at the outer ends of the arms and engageable with said concave surface, an upward projection on each frame above the pivot shaft and at the side of a vertical plane through the shaft axis and away from its outwardly extending arm, each upwardly extending projection having an angularly disposed flat face, said faces converging towards said vertical plane in uniform relation, a shaft rotatably and demountably supported by said faces and having its axis coincident with the axis of said concave face during a measuring operation and a gauge mounted on the last-mentioned shaft and engageable said concave surface.

5. In a gauge for measuring curvature of a surface, a pair of generally triangular shaped frames having outwardly extending divergent arms, means pivotally connecting adjacent lower portions of the frames, spaced coaxial rollers respectively secured to the pivoted portions of the frames, rollers secured to the outer ends of said frames, said rollers cooperatively engaging the surface being measured and angularly locating the frames with respect to each other, an upward projection on each frame above its pivotal connection and at one side of a vertical plane including the axis of said pivotal connection, said upward projections being respectively provided with flat faces extending longitudinally of the roller axes and converging downward and uniformly with respect to said vertical plane, a shaft rotatably supported by said flat faces and having its axis lying within said vertical plane, and a gauging mechanism supported by the shaft and engageable with the curved surface being measured.

6. In a gauge for measuring curved surfaces, a pair of frames having divergent outwardly extending arms, a pivot shaft connecting adjacent lower frame portions for pivotal movement about the shaft axis, axially spaced rollers supporting the lower frame portions, said rollers having axes coincident with the shaft axis, rollers respectively supporting the outer ends of said arms and axially parallel to said rollers supporting the lower frame portions, all of said rollers being engageable with the curved surface during its measurement and angularly locating the frames with respect to each other, each frame having an upwardly extending arm above the shaft axis and at the side of a vertical plane through the shaft axis away from its outwardly extending arm, each upwardly extending projection having an angularly disposed flat face disposed longitudinally of the shaft axis, said faces converging downwardly in corresponding relation to said vertical plane, a gauge-supporting shaft supported by said faces and having its axis in said vertical plane, and a gauge supported by the last-mentioned shaft and engageable with the surface being measured.

7. In a gauge for measuring the curvature of a concave surface, a pair of generally triangular shaped frames having upwardly extending divergent arms, a hub on the lower end of each arm, a pivot shaft axially extending through said hubs to provide for relative swinging movement of one frame with respect to the other and about the axis of said shaft, a pair of spaced rollers coaxial with said shaft and located respectively at the ends of the shaft and cooperatively supporting said hubs, a pair of rollers supporting the outer end of each arm and positioned axially parallel to said shaft axis, all of said rollers being adapted to rest against the concave surface being measured for positioning the frames relative to each other, each frame having an upwardly extending projection above the shaft and at the side of a vertical plane extending through said shaft axis, each projection extending laterally away from the outer extending arm on its frame, each projection having an angularly disposed flat face, said faces converging downwardly towards each other, the intersection of the planes determined by said faces lying within said vertical plane and extending parallel to said shaft axis, a gauge supporting shaft supported by said faces, and a gauge supported by the gauge supporting shaft and engageable with said concave surface during a measuring operation.

8. In a gauge for measuring the curvature of a concave surface, a pair of generally triangular shaped frames having outwardly extending divergent arms, a hub on the lower end of each arm, a pivot shaft axially extending through and journalled in said hubs, said shaft providing for a swinging movement of the frames relative to each other and about the shaft axis, a pair of axially spaced rollers coaxial with the shaft and mounted on the ends of the shaft adjacent said hubs, a pair of rollers supporting the outer end of each arm and axially parallel to the shaft axis, all of said rollers being adapted to rest against the concave surface being measured to cooperatively angularly position the frames with respect to each other, an upward projection on each frame above the shaft and at a side of a vertical plane extending through the shaft axis, each projection being located at the side of the vertical plane away from the outwardly extending arm of its supporting frame, each projection having a longitudinally extending flat face parallel to the shaft axis, said faces converging downwardly towards each other, the intersection of the planes determined by said faces lying in said vertical plane, a cylindrical shaft rotatably supported by said flat faces parallel to the pivot shaft axis, a gauge adjustably supported by the last-mentioned shaft at an end of said shaft and extending past the ends of each of said frames, said gauge having a stem engageable with said concave surface, and said gauge being rotatable with said last-mentioned shaft to measure said surface.

References Cited in the file of this patent
UNITED STATES PATENTS

| | | |
|---|---|---|
| 2,599,835 | Johnson et al. | June 10, 1952 |
| 2,677,191 | Smith | May 4, 1954 |